US008387157B2

(12) United States Patent
Kim et al.

(10) Patent No.: US 8,387,157 B2
(45) Date of Patent: Feb. 26, 2013

(54) DIGITAL BROADCAST RECEIVER HAVING ATTACHABLE AND SEPARABLE STORAGE MEANS

(75) Inventors: Jang Yong Kim, Seoul (KR); Young Ki Kim, Suwon-si (KR); Sung Ick Cho, Seoul (KR); Kyung Lae Roh, Seoul (KR)

(73) Assignee: Humax Co., Ltd., Seongnam-Si (KR)

( * ) Notice: Subject to any disclaimer, the term of this patent is extended or adjusted under 35 U.S.C. 154(b) by 1219 days.

(21) Appl. No.: 10/498,213

(22) PCT Filed: Oct. 23, 2003

(86) PCT No.: PCT/KR03/02238
§ 371 (c)(1),
(2), (4) Date: Jun. 10, 2004

(87) PCT Pub. No.: WO2004/039079
PCT Pub. Date: May 6, 2004

(65) Prior Publication Data
US 2005/0152669 A1 Jul. 14, 2005

(30) Foreign Application Priority Data
Oct. 26, 2002 (KR) ........................ 10-2002-0065697

(51) Int. Cl.
*G06F 1/26* (2006.01)
(52) U.S. Cl. ........................................ 726/36
(58) Field of Classification Search .................. 380/200; 726/36
See application file for complete search history.

(56) References Cited

U.S. PATENT DOCUMENTS
5,149,048 A * 9/1992 Morehouse et al. .......... 248/632
(Continued)

FOREIGN PATENT DOCUMENTS
EP   1014715 A2 * 6/2000
JP   2003-85880 A   3/2003
(Continued)

*Primary Examiner* — Michael S Mcnally
*Assistant Examiner* — Daniel Hoang
(74) *Attorney, Agent, or Firm* — Birch, Stewart, Kolasch & Birch, LLP

(57) ABSTRACT

The present invention relates to a recording and storage means in digital STB (Set Top Box) and PVR (Personal Video Recorder) and method thereof. The digital broadcast receiver for receiving real-time digital broadcast programs comprises: storage means for storing broadcast programs, being attachable and separable to and from a set by a user without taking the set apart; a coupling means for attachment and separation of the storage means to and from a main body of the broadcast receiver; and a connection means as a path for power supply of the storage means, and signal. The method for storing real-time digital broadcast programs comprises the steps of: extracting a broadcast program to be stored from a digital broadcast stream being received by a tuner; detecting whether a storage means is installed in a broadcast receiver; if the storage means is installed, storing the broadcast program in the storage means, if the storage means is not yet installed, storing the broadcast program in a temporary memory, and redetecting the installation of the storage means and if the installation of the storage means is confirmed, storing the broadcast program stored in the temporary memory in the storage means. The present invention allows users to record and store real-time data for an extended period of time, simply by changing the storage medium with a new one without interruption of the data being received.

12 Claims, 6 Drawing Sheets

U.S. PATENT DOCUMENTS

| | | | |
|---|---|---|---|
| 6,311,011 B1 * | 10/2001 | Kuroda | 386/46 |
| 6,418,492 B1 * | 7/2002 | Papa et al. | 710/302 |
| 7,512,964 B2 * | 3/2009 | Rodriguez et al. | 725/142 |
| 2003/0070181 A1 * | 4/2003 | Holm | 725/134 |
| 2003/0149980 A1 * | 8/2003 | Hassell et al. | 725/39 |

FOREIGN PATENT DOCUMENTS

| | | |
|---|---|---|
| KR | 1999-39064 A | 6/1999 |
| KR | 2002-79168 A | 10/2002 |
| WO | 01/20899 A1 | 3/2001 |

* cited by examiner

DIGITAL BROADCAST RECEIVER HAVING ATTACHABLE AND SEPARABLE STORAGE MEANS

TECHNICAL FIELD

The present invention relates to a recording and storage means in digital STB (Set Top Box) and PVR (Personal Video Recorder) and method thereof, more particularly, to a digital broadcast receiver having an attachable and separable storage means for storing digital broadcast programs.

BACKGROUND ART

A digital set top box (STB) has rapidly spread in recent years largely because the digital STB presents a variety of advantages, compared to general analog televisions, such as it maximized channel usage, improved video and sound signal qualities, and provided a more convenient way to transmit supplementary service data.

Digital (satellite) broadcast system is different from analog broadcast system adapted in general analog televisions in terms of the transmission method of broadcast programs.

Specifically speaking, a digital STB receives a broadcast in a compressively encoded packet stream under an MPEG algorithm, and decodes (restores) the broadcast to original signals before being encoded. An analog television, on the other hand, receives program broadcast signals in analog and regenerates them.

Moreover, the STB, similar to a VCR function in the analog television, allows a user to record or schedule to record in advance (i.e. reserve recording) a particular broadcast program on a particular channel the user selected. The recorded broadcast program data are stored in a memory space like a hard disk in compressively encoded form.

Because of this, many attempted to increase memory capacity in order to record or reserve recording more broadcast programs. However, it is also a well-known fact that increased storage capacity of memory like hard disk is accompanied with increased price. Therefore, in view of price competitiveness, it is rather an unrealistic notion to increase memory capacity for use in the STB without limit.

A conventional device and method thereof are now discussed below.

FIG. 1 is a block diagram of a conventional STB/PVR.

As is seen in the drawing, a STB includes a controller 106 for controlling system components, a tuner 101 for turning received signals, a QPSK decoder 102 for decoding received signals using QPSK modulation, a DEMUX 103 for restoring original independent signals or a group of those signals by separating multiplexed composite signals and restoring them to original signals or a signal group, a MPEG decoder 104 for decoding MPEG audio/video data, an A/V encoder 105 for encoding audio/video video in order to output them to another device, and an internal storage device 107 for storing received data.

In case of a STB or a PVR having a built-in storage device illustrated in FIG. 1, the storage device is fixed in a certain position inside of the product. Hence, when a user wants to add a new program after recording and storing TV broadcasts for a certain period of time, one of already recorded programs had to be deleted, and storage extension to avoid this problem was fundamentally impossible.

According to another traditional embodiment, a separate storage device like a VCR could be added. However, broadcast signals, which are real-time data, cannot be recorded when a tape (for the general VCR) or a storage device (for a STB/PVR with a fixed storage device) is being changed.

Particularly, in case of the conventional fixed storage device, because all individuals could handle and manage recordings only through one single storage device built in the STB/PVR, different users could easily damage files in the storage device and it was virtually impossible to utilize the storage device segregately.

Further, the recordings could not be transmitted, duplicated or stored without the help of an external storage device.

To be short, the fixed storage device, once recording is complete, cannot be independently separated for individual handling or management. For separate handling, a separate external recording device is required to transmit, duplicate and store the stored recordings, but if there is no such external recording device, the fixed storage device normally has to be taken into pieces by a specially trained handling expert therefor. What happens if the storage device is exchanged, extended and separated by a general user not by the handling expert is that when the product with a built-in fixed storage device, which is a magnetic storage device being very sensitive to impact, receives any form of shock during the usage or the separation or installation procedure, it is not buffed from the shock and the surface of the storage device is likely to be damaged thereby. As a result, stability of the product and durability of the recordings cannot be secured.

In other words, a fixed storage device built in the STB/PVR can be easily damaged by internal/external defects and impacts.

However, since the recording device cannot be separately shipped and carried, a separate handling management and transport means is required for the STB/PVR having a built-in fixed storage device.

If the fixed storage device is forcedly separated, recordings therein and the storage device itself can be easily damaged.

That is to say, if the fixed storage device is forcedly separated from the STB/PVR, the already stored recordings and the storage device are often damaged.

DISCLOSURE OF INVENTION

It is, therefore, an object of the present invention to provide a digital broadcast receiver having an attachable and separable storage means for storing received data, wherein the storing means can be attached and separated even when power is being applied, and a method for continuously storing real-time broadcast programs simply by exchanging a storage means, regardless of the capacity thereof, with another storage means.

Another object of the present invention is to increase the user's convenience by providing a display device that helps the user to see a fixed device in a cooled and buffed, mounted module and a state whether the device is attached or separated.

To achieve the above object, there is provided a digital broadcast receiver for receiving real-time digital broadcast programs, including: storage means for storing broadcast programs, being attachable and separable to and from a set by a user without taking the set apart; a coupling means for attachment and separation of the storage means to and from a main body of the broadcast receiver; and a connection means as a path for power supply of the storage means, and signal.

Another aspect of the invention provides a method for storing real-time digital broadcast programs, which includes the steps of: extracting a broadcast program to be stored from a digital broadcast stream being received by a tuner; detecting whether a storage means is installed in a broadcast receiver; if the storage means is installed, storing the broadcast program in the storage means, if the storage means is not yet installed, storing the broadcast program in a temporary memory, and redetecting the installation of the storage means and if the installation of the storage means is confirmed, storing the broadcast program stored in the temporary memory in the storage means.

If the storage means is separated when storing the broadcast program, the broadcast program is stored in the temporary memory, and the installation of the storage means is redetected.

Also, the installation of the storage means is detected at regular intervals. If the installation of the storage means is confirmed, a power signal and a control signal are input to the storage means, and a file system is updated for an operation of the storage means.

According to the present invention, without deleting already stored programs, a user is able to record and store broadcast programs for an extended period of time regardless of capacity limit, and has an option to choose a general STB or a PVR with a built-in storage medium at any time.

In case of the STB/PVR to which the present invention is applied, the user can temporarily store a broadcast program in an internal storage device even when he changes a storage means module, and later store the broadcast program in a storage means.

The present invention also allows users to record and store real-time data for an extended period of time, simply by changing the storage medium with a new one without interruption of the data being received.

As for a traditional conventional fixed storage device, all individual users could handle and manage respective recordings only through one single storage device built in the STB/PVR. The present invention, however, allows a user to attach and separate a plurality of discrete storage means, whereby a file can be protected from damages caused by other users and used independently.

Moreover, since storage medium can easily be attached and separated even when power is on, users are not able to transfer, duplicate and store recordings in the storage medium, without using an external recording device. In this way, the storage medium is much less damaged by an inexperienced user or from users' carelessness.

In addition, the storage medium, which is sensitive to external shocks and vibration, can be shipped and carried individually, and thus transportation expenses can be greatly reduced and handling can be much easier.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Figure 1:
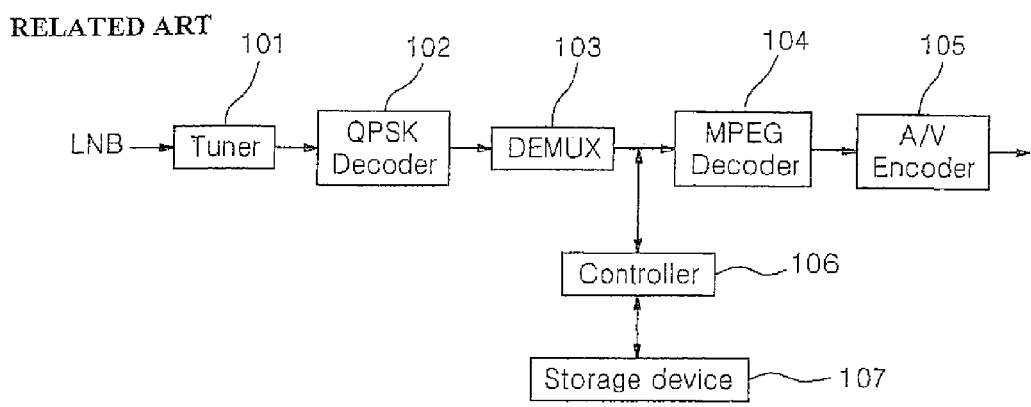
FIG. 1 is a block diagram of a related art STB/PVR.
Figure 2:
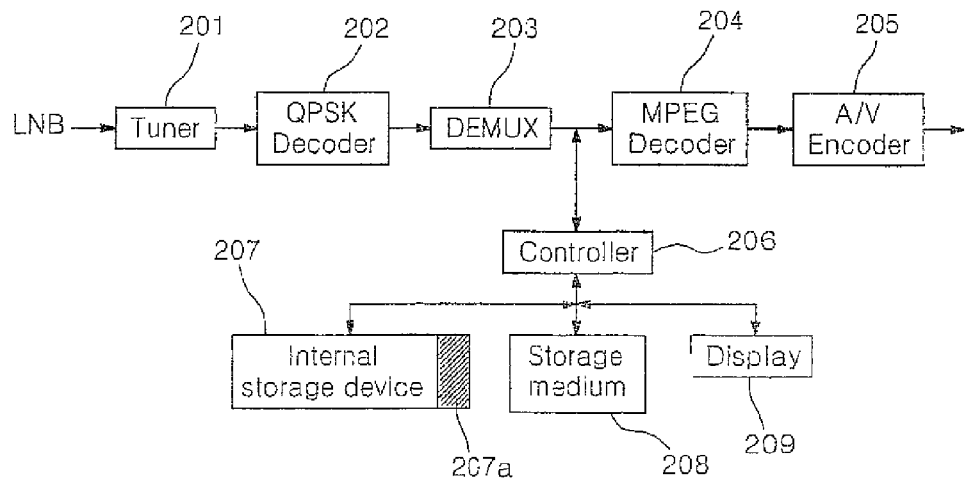
FIG. 2 is a block diagram of a set top box mounted with an attachable and separable and hot swap-capable storage means according to a preferred embodiment of the present invention.

FIG. 2 is a block diagram of a set top box (STB) mounted with an attachable and separable and hot swap-capable storage means according to a preferred embodiment of the present invention. As shown in the drawing, the STB includes a controller 206 for controlling system components, a tuner 201 for turning received signals, a QPSK decoder 202 for decoding received signals using QPSK modulation, a DEMUX 203 for restoring original independent signals or a group of those signals by separating multiplexed composite signals and restoring them to original signals or a signal group, a MPEG decoder 204 for decoding MPEG audio/video data, an A/V encoder 205 for encoding audio/video video in order to output them to another device, an internal storage device 207 as a first storage means for storing received data, the device including a buffer 207a for temporarily storing received data whenever necessary, a plurality of storage medium 208 as a second storage means being attachable and separable, and a display 209 for displaying an operational state of system and informing or warning an amount of data being stored in the storage means.

Referring to FIG. 2, the controller 206 controls general operations of a STB by means of a microprocessor for example.

Particularly, the controller 206 controls the internal storage device, which is the first storage means, to receive/store data. And then if the second storage means is inserted, the controller 206 informs this to a user at the user's request or when predetermined data is stored in the first storage means, to control a path for changing data storage to the second storage means, and transfers the stored data in the first storage means to the second storage means during the storage path change.

Also, the controller controls specific information to be stored in respective storage means.

In other words, the user is allowed select a broadcast program he wants to record or reserve recording, using a keypad or a remote control (not shown), and based on recording or reservation recording information the user input (i.e. channel, kind of broadcast program, start time of recording or reserved recording, end time of recording or reserved recording and so forth), the controller 206 stores this information in the internal storage device or a pre-designated area in the storage medium.

The operation of the STB of FIG. 2 is now discussed.

The tuner 201 and the QPSK decoder 202, complying to a tuning control signal provided from the controller 206, extract audio and video packet data for use in a broadcast program of a selected channel, out of broadcast signals that are received through a broadcast signal receiver (not shown)

the user selected, or broadcast signals that are received by tuning a specific reserved channel; convert to an intermediate frequency, decode and correct errors in those extracted audio and video packet data in order to restore the data to a transmission stream; and transmits the restored data stream to the DEMUX 203.

The DEMUX 203 then separates audio packet data and video packet data from the transmission stream, and transmits the audio and video packet data to the MPEG audio/video decoder 204.

On the other hand, by applying a general audio decoding process, the MPEG audio decoder 204 decodes (restores) compressively encoded digital audio signals to original signals before being encoded, under a control signal and a MPEG audio algorithm standard (e.g. MPEG-2 audio algorithm). Likewise, by applying a general video decoding process, the MPEG audio decoder 204 decodes (restores) compressively encoded digital video signals to original signals before being encoded, under a control signal and a MPEG video algorithm standard (e.g. MPEG-2 video algorithm).

Output signals from the MPEG audio/video decoder 204 are transmitted to the MPEG audio/video encoder 205 for selective compression (i.e. encoding under a selected compression rate) before being recorded (or stored).

The controller controls specific information to be stored in respective storage means.

To be more specific, the user can select a broadcast program he wants to record or reserve recording, using a keypad or a remote control (not shown), and based on recording or reservation recording information the user input (i.e. channel, kind of broadcast program, start time of recording or reserved recording, end time of recording or reserved recording and so forth), the controller 206 stores this information in the internal storage device or a pre-designated area in the storage medium.

The controller decides whether the second storage means is inserted when controlling the internal storage device, the first storage means, to receive/store data.

If the user requests or predetermined data is stored in the first storage means, the controller informs the user that the second storage means is now available, to control a path for changing data storage to the second storage means, and transfers the stored data in the first storage means to the second storage means during the storage path change.

Figure 3:
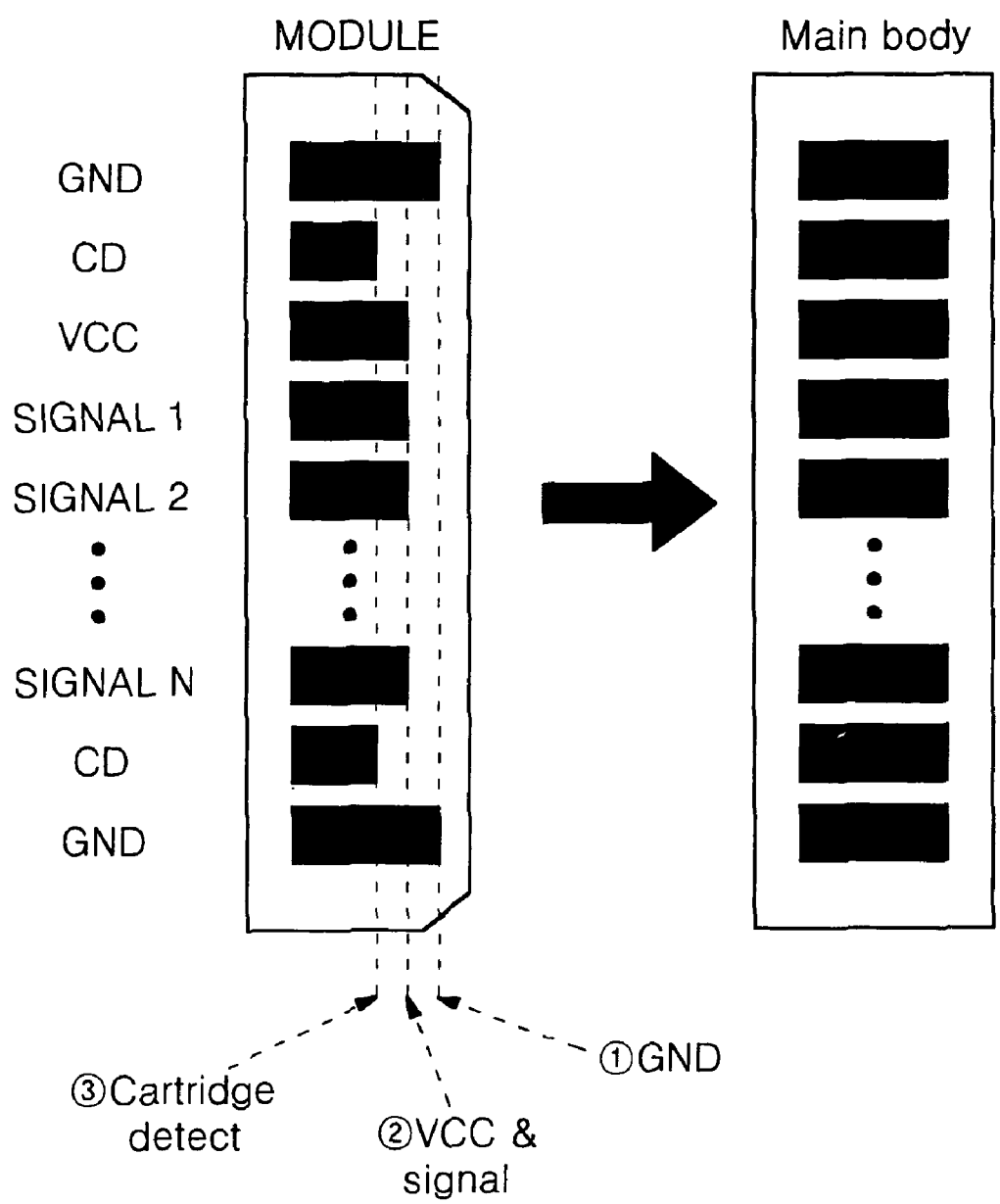
FIG. 3 is a diagram illustrating a structure of a signal connector for recognizing a new storage means suggested by the present invention at a STB/PVR when loading the storage means to the STB/PVR.

FIG. 3 is a diagram illustrating the structure of a signal connector for recognizing a new storage means suggested by the present invention at a STB/PVR when loading the storage means to the STB/PVR.

As illustrated in the drawing, in case of connecting a module with a built-in storage medium to a main body, a pattern length of the module is pre-adjusted to connect to the main body in order of GND, VCC&SIGNAL CD. After a CD signal is detected, the controller of the STB/PVR applies power to the storage medium and controls a control signal of this newly inserted storage means in a certain delay, whereby the user can easily attach or separate the storage medium at any time even when power is on.

That is, when the storage means module is installed at a connection means, it is connected in order of an earth portion, a power/signal line, and the storage medium. On the other hand, when the storage means module is separated from the connection means, it is separated in order of the storage medium, the power/signal line, and the earth portion.

Figure 4:
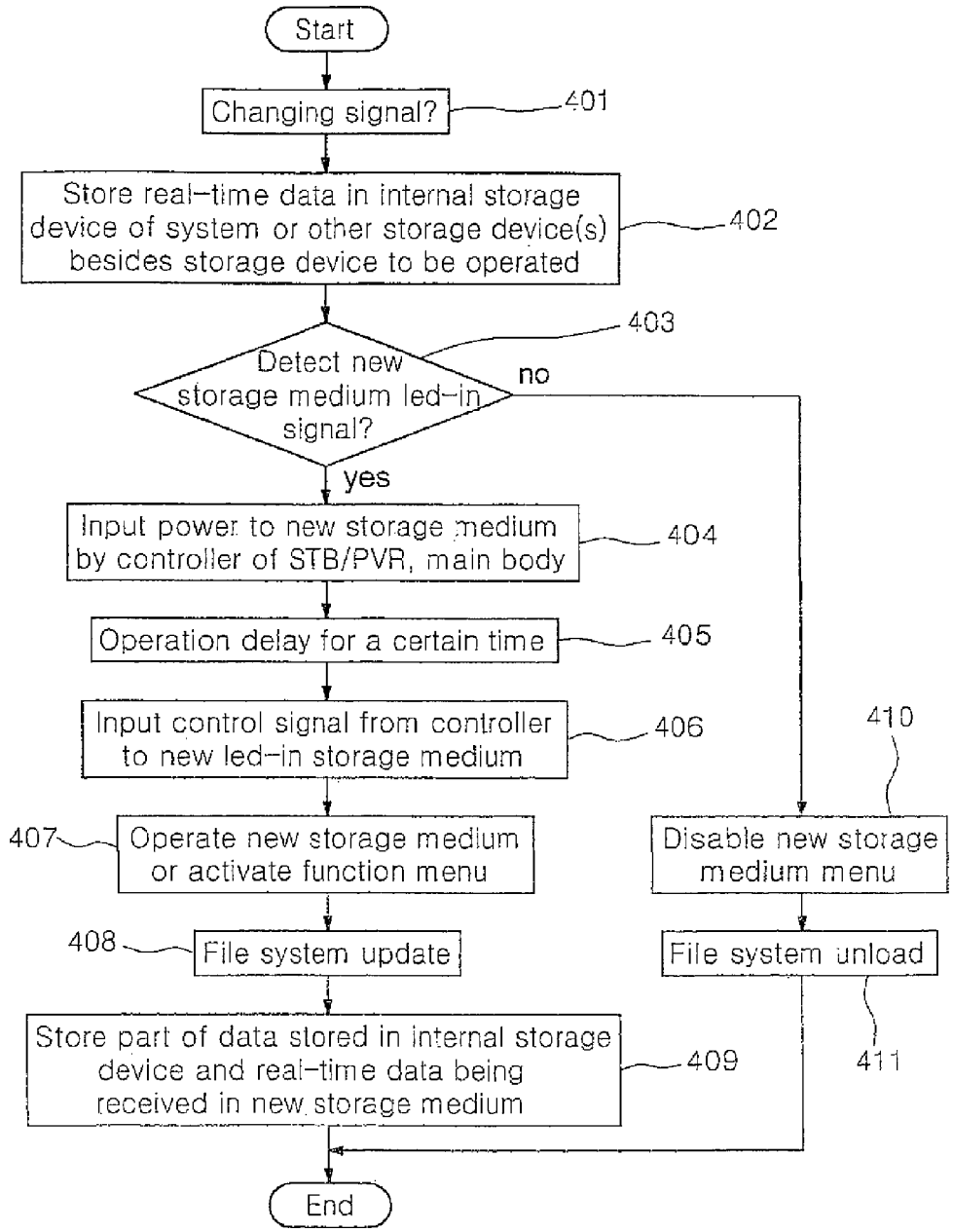
FIG. 4 is a flow chart describing a hot swap storage method according to a lead-in storage means in a STB/PVR of the present invention.

FIG. 4 is a flow chart describing a hot swap storage method according to a lead-in storage means in a STB/PVR of the present invention.

As for the real-time receiving STB having the constitution illustrated in FIG. 2, received data is stored in the internal storage device 207, which is the first storage portion.

According to a storage status in the display or in response to a warning message from the controller, the user or the system controller inputs a storage means changing signal, in order to transfer the data being received to the first storage means to the storage medium 208 that is the second storage portion (S401).

Under the changing signal, the real-time data is stored in the buffer of the internal storage device for a certain period of time, or since there is more than one storage medium, other already existing storage medium are also used for storing the real-time data (S402).

As shown in FIG. 3, it is decided whether or not a CD signal for informing the insertion of a new storage means as the second storage means is detected (S403). In case the second storage means is led in the STB, a power signal and a control signal are input to the second storage means, under the control of the controller (S404).

Since the control signal is input to the second storage means after a predetermined time delay followed by the power signal input, the user can attach or separate the storage means even when the power is on (S405, S406).

Next is a procedure for establishing a suitable configuration to enable the operation of the second storage means.

In other words, an operation and function menu for the second storage means is activated, and a file system is updated (S407, S408).

Afterwards, the stored data in the first storage means is transferred to the second storage means, and other data being received is stored in the second storage (S409).

Meanwhile, if it turns out that the second storage means is not led in the STB in Step 403, the configuration for the second storage means needs not to be established (S410, S411).

Figure 5:
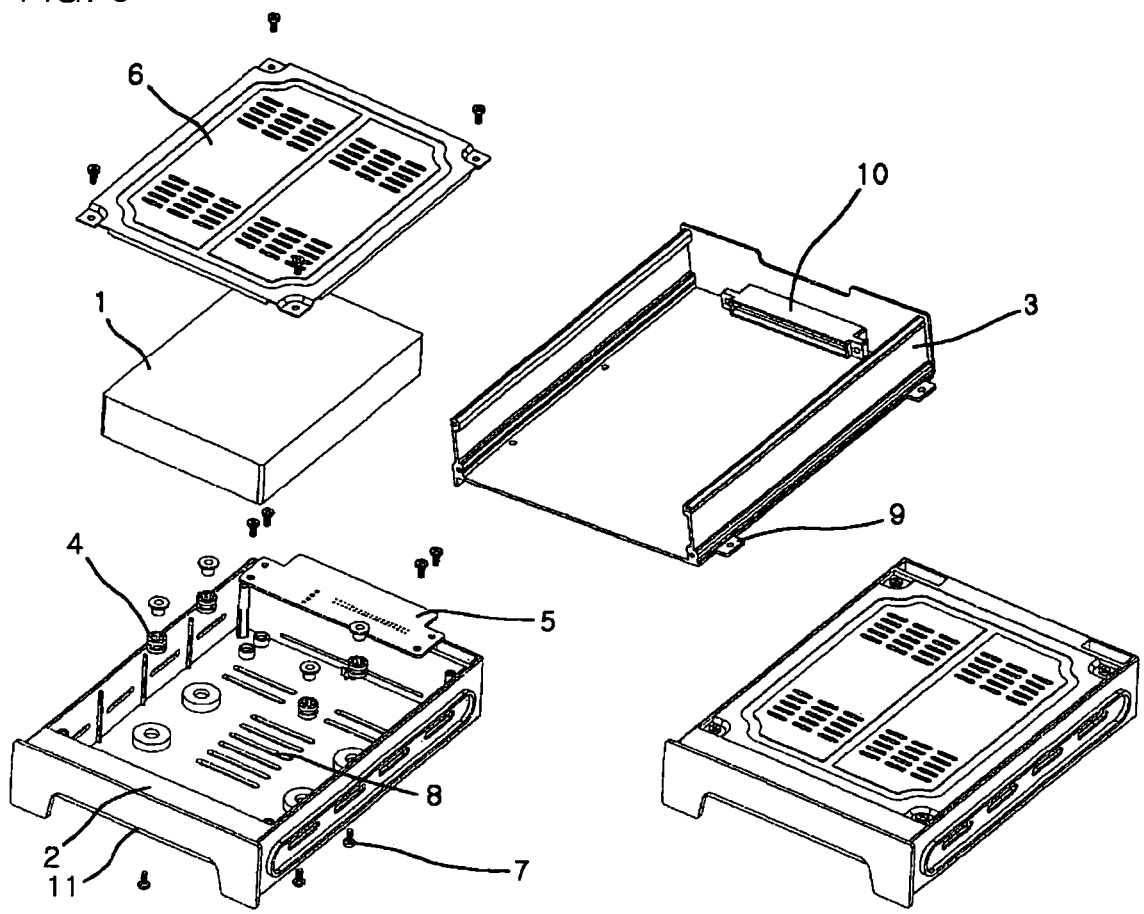
FIG. 5 is a detailed view of a storage means module assembly, in which a storage medium, namely a new storage means, is mounted and the assembly is led in an opening portion of a STB/PVR.

FIG. 5 is a detailed perspective view of a storage means module assembly, in which a storage medium, namely a new storage means, is mounted and the assembly is led in an opening portion of a STB/PVR.

As depicted in the drawing, the storage means module assembly includes a storage medium 1 for storing recordings; a case 2 for protecting the storage medium from internal/external impacts, in which the case contains a shock absorber and a cooler, and has a handle for permitting a user to easily attach and separate the storage medium; a signal connection portion having a data transfer connection portion 10 and guide rails 3, for safely guiding the storage medium module to a connection cite, and transmitting and connecting data to a main body; a shock absorber 4 for preventing recorded data from being damaged by vibration of the storage medium or an external impact; an insertion slot 5 enabling data transfer between the storage medium and a set; a cover 6 having a safety structure from an external impact and a ventilation structure; and fixing screws 7 and 9 for fixing the entire module more firmly.

More details follow to provide a better description on each component.

FIG. 5 shows the storage means module assembly to be mounted on a STB or a PVR, more specifically, at an outside surface of the STB or the PVR. The storage means module assembly includes the storage means module having a connection means 5 (i.e. the insertion slot) at a rear surface, for electrically connecting the assembly with internal parts of STB or the PVR; and the signal connection portion having the guide rails 3 attached to both sides for facilitating the insertion of the storage means module, and the connection means 10 disposed at a rear surface, for connection with the storage means module.

The storage means module includes the storage medium 1 for storing recordings, the shock absorber 4 for protecting the storage medium from internal/external impacts, the case 11 with a handle for making the attachment and separation of the storage medium easy, the insertion slot 5 attached to the rear surface, transferring recording data in the storage medium to the STB, screws 7 for fastening or fixing the storage means module more firmly, and the cover 6 with a ventilation structure, for protecting the assembly from an external impact.

As aforementioned, the signal connection portion includes guide rails 3 on both sides for facilitating the insertion of the storage means module, the connection means 10 on the rear surface for connection with the storage means module, and the fixing means 9 on one side for fixing the signal connection portion.

Figure 6:
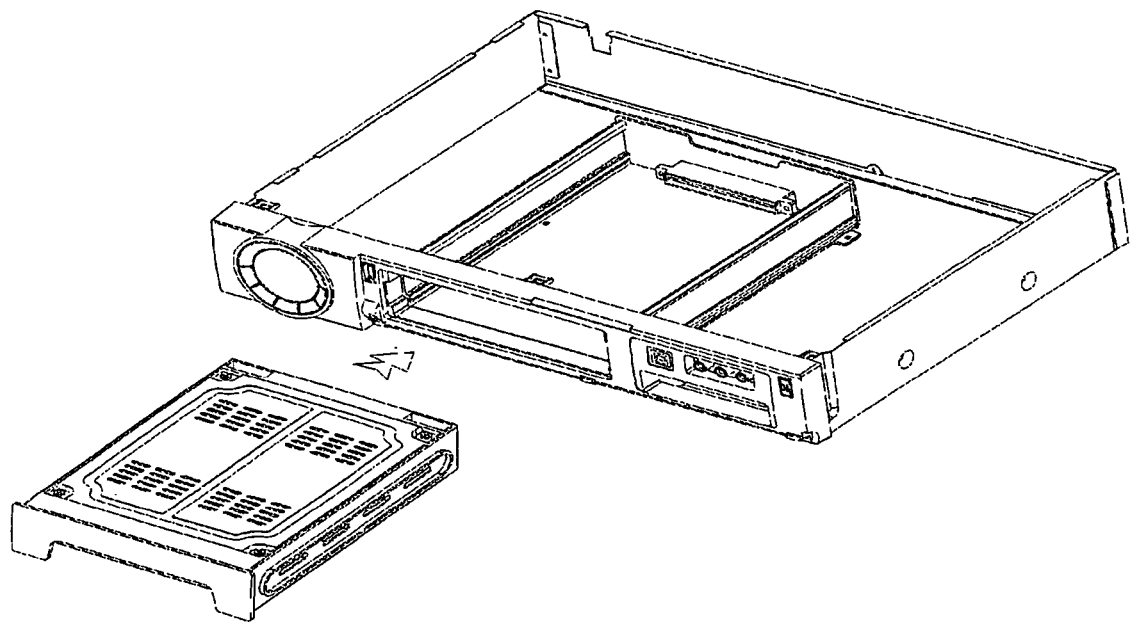
FIG. 6 illustrates an inside structure of a STB/PVR and how an attachable and separable storage means module is inserted.

FIG. 6 illustrates the inside structure of a STB/PVR and how an attachable and separable storage means module is inserted.

Figure 7:
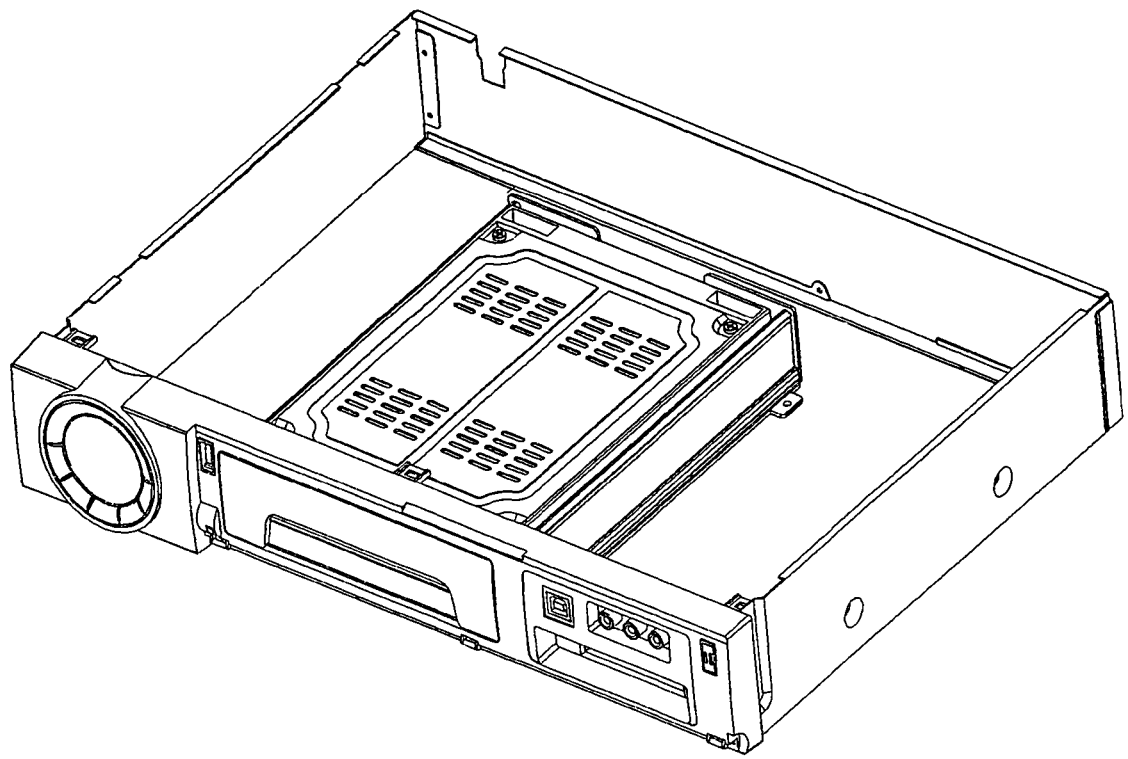
FIG. 7 depicts an inside structure of a STB/PVR having a built-in attachable storage means module.

FIG. 7 depicts the inside structure of a STB/PVR having a built-in attachable storage means module.

Figure 8:
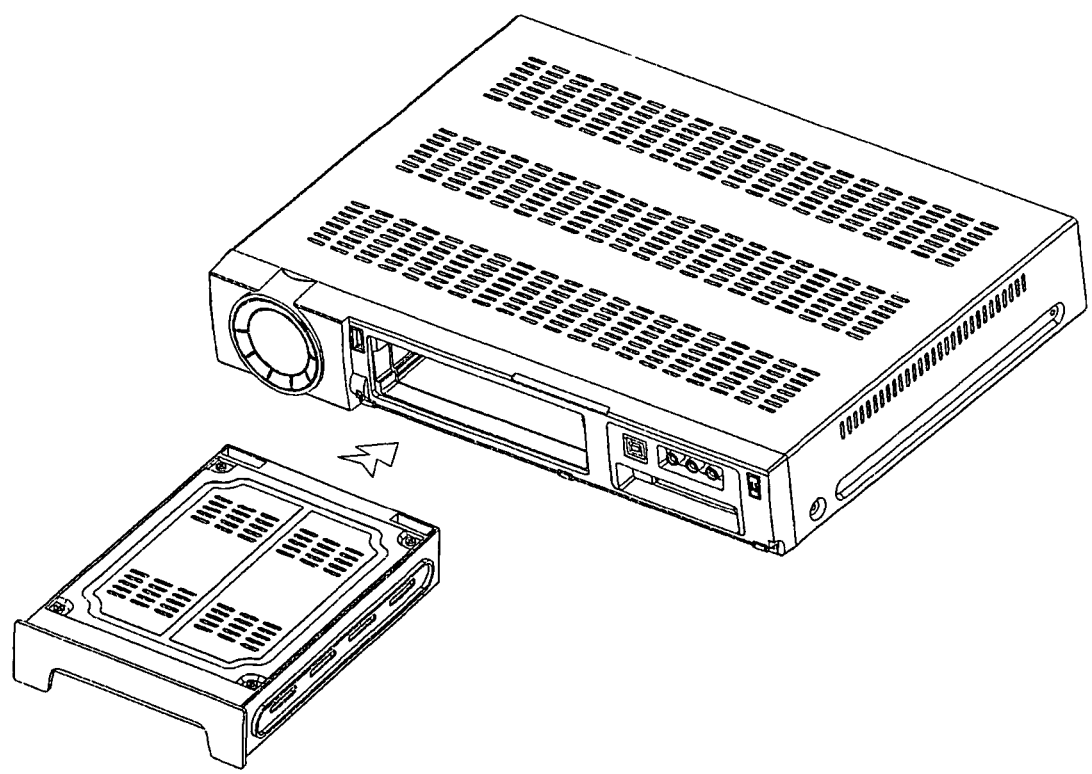
FIG. 8 depicts an attachable and separable storage means module being separated from a STB/PVR.

FIG. 8 depicts an attachable and separable storage means module being separated from a STB/PVR.

Figure 9:
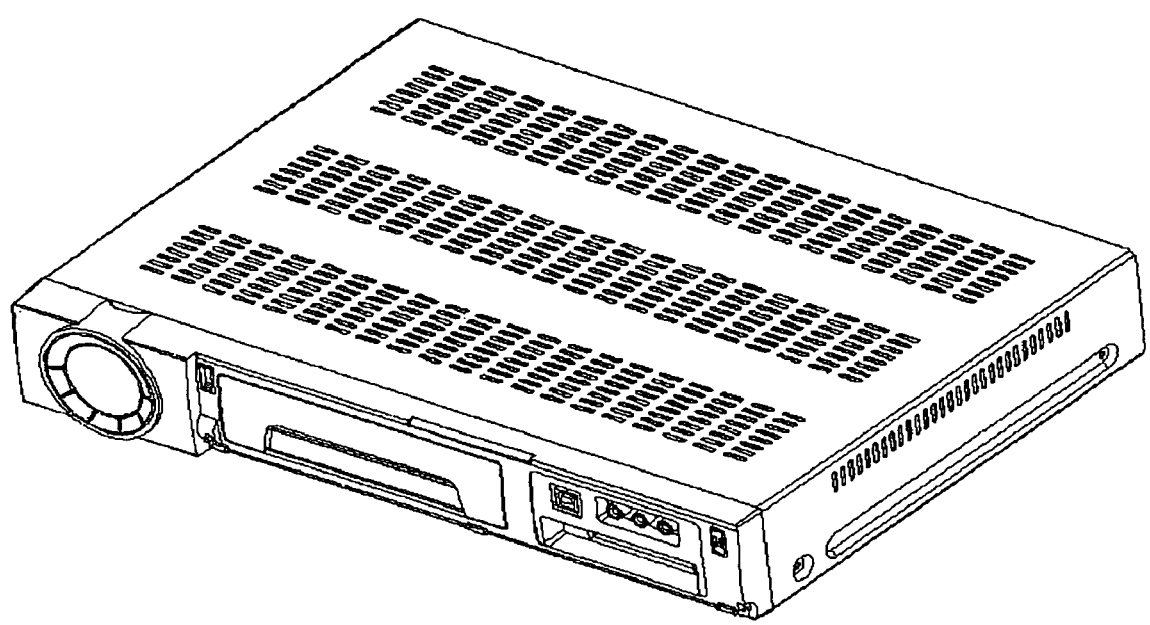
FIG. 9 illustrates a STB/PVR having a built-in attachable and separable storage means.

FIG. 9 illustrates a STB or a PVR having a built-in attachable and separable storage means.

While the invention has been shown and described with reference to certain preferred embodiments thereof, it will be understood by those skilled in the art that various changes in form and details may be made therein without departing from the spirit and scope of the invention as defined by the appended claims. For example, the invention is also applicable when the storage medium 208 of FIG. 2 is installed.

That is to say, when the storage medium, the second storage means, takes over the role of the internal storage device 207, namely receiving/storing real-time data, the procedure of the invention can be applied as well.

INDUSTRIAL APPLICABILITY

Without deleting already stored programs, a user is able to record and store broadcast programs for an extended period of time regardless of capacity limit, and has an option to choose a general STB or a PVR with a built-in storage medium at any time.

In case of the STB/PVR to which the present invention is applied, the user can temporarily store a broadcast program in an internal storage device even when he changes a storage means module, and later store the broadcast program in a storage means.

The present invention also allows users to record and store real-time data for an extended period of time, simply by changing the storage medium with a new one without interruption of the data being received.

In the present invention, a plurality of discrete storage means is attachable and separable, whereby a file can be protected from damages caused by other users and used independently.

Moreover, since storage medium can easily be attached and separated even when power is on, users are not able to transfer, duplicate and store recordings in the storage medium, without using an external recording device. In this way, the storage medium is much less damaged by an inexperienced user or from users' carelessness.

In addition, the storage medium, which is sensitive to external shocks and vibration, can be shipped and carried individually, and thus transportation expenses can be greatly reduced and handling can be much easier.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A digital broadcast receiver configured to receive a real-time digital broadcast program, comprising:
   a first storage device;
   a second storage device being detachable;
   a controller configured to
      receive the real-time digital broadcast program, and
      while receiving the real-time digital broadcast program,
         first detect that the second storage device is not installed in the digital broadcast receiver and automatically store a first part of the real-time digital broadcast program in the first storage device; and
         later detect that the second storage device is installed in the digital broadcast receiver, automatically store a second part of the real-time digital broadcast program in the second storage device, and automatically transfer the first part of the real-time digital broadcast program from the first storage device to the second storage device, the controller configured to automatically transfer the first part to the second storage device while the second part is being stored in the second storage device;
   a mechanical coupler configured to physically connect the second storage device to the digital broadcast receiver; and
   an electrical coupler configured to electrically connect the second storage device to the digital broadcast receiver, the electrical coupler configured to supply power and data to the second storage device,
   wherein the first and the second storage devices comprise a digital storage medium, including a hard disk,
   wherein the electrical and mechanical couplers are configured to perform a hot swap, and
   wherein, for the hot swap, the electrical coupler is configured to be
      connected in an order of an earth connection, a signal and power connection, and a storage device detection signal connection, and
      separated in an order of the storage device detection signal connection, the signal and power connection, and the earth connection.

2. The digital broadcast receiver according to claim 1, wherein the electrical and mechanical couplers are combined in one body.

3. The digital broadcast receiver according to claim 1, wherein the mechanical coupler comprises a shock absorber configured to protect the second storage device from internal/external impacts, and an attachment and separation guide.

4. The digital broadcast receiver according to claim 1, further comprising a detector configured to detect whether or not the second storage device is installed.

5. The digital broadcast receiver according to claim 1, the second storage device includes at least one storage disc.

6. The digital broadcast receiver according to claim 1, wherein the first storage device comprises a temporary memory.

7. The digital broadcast receiver according to claim 1, wherein the second storage device further comprises a structure for facilitating attachment and separation of the second storage device from outside.

8. A method of storing a real-time digital broadcast program in a digital broadcast receiver having a first storage device, a second storage device, and a controller, the method comprising the following steps, each performed by the controller:

receiving the real-time digital broadcast program;
while receiving the real-time digital broadcast program,
first detecting that the second storage device is not installed in the digital broadcast receiver and automatically storing a first part of the real-time digital broadcast program in the first storage device;
later detecting that the second storage device is installed in the digital broadcast receiver, automatically storing a second part of the real-time digital broadcast program in the second storage device, and automatically transferring the first part of the real-time digital broadcast program from the first storage device to the second storage device, the step of automatically transferring being performed while the second part is stored in the second storage device,
wherein the first and the second storage devices comprise a digital storage medium, including a hard disk; and
performing a hot swap comprising:
connecting the second storage device in an order of an earth connection, a signal and power connection, and a storage device detection signal connection; and
disconnecting the second storage device in an order of the storage device detection signal connection, the signal and power connection, and the earth connection.

9. The method according to claim 8, further comprising:
storing the broadcast program in the first storage device if the second storage device does not have a sufficient storage for storing the broadcast program.

10. The method according to claim 8, further comprising:
storing the broadcast program in the first storage device if the second storage device is separated when storing the broadcast program; and
redetecting the installation of the second storage device.

11. The method according to claim 8, further comprising:
detecting at regular intervals whether or not the second storage device is installed.

12. The method according to claim 8, further comprising:
inputting a power signal and a control signal to the second storage device, and updating a file system for an operation of the second storage device.

* * * * *